United States Patent [19]

Aguado et al.

[11] Patent Number: 5,832,637
[45] Date of Patent: Nov. 10, 1998

[54] METHOD OF OPERATING A SNOWPLOW

[76] Inventors: Aleck P. Aguado, 541 Slinger Rd. #4, Slinger, Wis. 53086; Howard D. Hadler, 1061 Cedar St., West Bend, Wis. 53095; Lynn W. Schultz, N953 Hwy. G, Campbellsport, Wis. 53010; James A. Syburg, N67 W34017 Hwy. K, Oconomowoc, Wis. 53066; Thomas E. Weidner, 114 High St., Hartford, Wis. 53027; John M. Struck, N4638 County Trunk E, Iron Ridge, Wis. 53035; Gary Wendorff, 875 Willow La., Hartford, Wis. 53027; John H. Leverenz, 212 Green Valley Pl., West Bend, Wis. 53095

[21] Appl. No.: 675,990

[22] Filed: Jul. 9, 1996

Related U.S. Application Data

[63] Continuation of Ser. No. 225,215, Apr. 8, 1994, abandoned, which is a continuation-in-part of Ser. No. 53,060, Apr. 26, 1993, abandoned.

[51] Int. Cl.⁶ ..................................................... E01H 5/04
[52] U.S. Cl. ................................................ 37/234; 37/236
[58] Field of Search .............................. 37/231, 236, 235, 37/234, 468, 266, 279, 283; 362/420, 418, 419, 424, 425, 431

[56] References Cited

U.S. PATENT DOCUMENTS

| | | | |
|---|---|---|---|
| 1,678,366 | 7/1928 | Tann | 362/418 |
| 3,201,878 | 8/1965 | Markwardt | 37/42 |
| 3,432,946 | 3/1969 | Peitl | 37/42 |
| 3,749,180 | 7/1973 | Coontz | 37/236 |
| 3,793,752 | 2/1974 | Snyder | 37/234 |
| 3,828,449 | 8/1974 | Miceli | 37/283 |
| 4,028,820 | 6/1977 | Simonds, Jr. | 37/234 |
| 4,304,056 | 12/1981 | Watson et al. | 37/231 |
| 4,439,939 | 4/1984 | Blau | 37/236 |
| 4,803,606 | 2/1989 | Rotter | 362/419 |
| 4,807,375 | 2/1989 | Irali | 37/236 |
| 4,821,436 | 4/1989 | Slocum | 37/283 |
| 4,907,357 | 3/1990 | Lilienthal | 37/236 |
| 4,999,935 | 3/1991 | Simi et al. | 37/236 |
| 5,050,321 | 9/1991 | Evans | 37/232 |
| 5,081,775 | 1/1992 | Veilleux | 37/236 |
| 5,111,603 | 5/1992 | Knowlton et al. | 37/231 |
| 5,125,174 | 6/1992 | Watson et al. | 37/235 |
| 5,136,795 | 8/1992 | Rosenberg | 37/283 |
| 5,193,296 | 3/1993 | Reilley | 37/236 |
| 5,195,261 | 3/1993 | Vachon | 37/236 |
| 5,265,356 | 11/1993 | Winter | 37/236 |
| 5,285,588 | 2/1994 | Niemela et al. | 37/234 |
| 5,353,530 | 10/1994 | Pieper | 37/231 |
| 5,361,519 | 11/1994 | Ciula et al. | 37/234 |
| 5,428,520 | 6/1995 | Skief | 362/418 |

*Primary Examiner*—Tamara L. Graysay
*Assistant Examiner*—Thomas A. Beach
*Attorney, Agent, or Firm*—Reinhart, Boerner, Van Deuren, Norris & Rieselbach, s.c.

[57] ABSTRACT

A snow-plow system having four major features: lighting system, a quick and easy disconnect/connect system, a reactive controlled pressure mechanism for applying a controlled pressure to the bottom edge of the moldboard of the plow, and a simple electric control to activate or deactivate the reactive controlled pressure mechanism. The present invention may be summarized as a snow-plow system that is mounted to a vehicle having a mounting frame by an easy connect and disconnect system connecting to the A-frame of the snow-plow by use of three mounting pins which hold the snow-plow system in place on the mounting frame of the vehicle and thereby rigidly connect the system to the vehicle. A light bar or lighting system also is rigidly mounted to the A-frame of the snow-plow at the mounting pins so that once the position of the lighting system is determined the relative position of the lighting system with respect to the vehicle does not change. A reactive controlled pressure mechanism that consists of a hydraulic control unit is operated by an electric control unit mounted in the vehicle. A reactive controlled pressure cylinder is pivotally mounted to the bottom of the A-frame and mechanically connected to the moldboard of the plow.

20 Claims, 11 Drawing Sheets

METHOD OF OPERATING A SNOWPLOW

This is a continuation of application Ser. No. 08/225,215 filed on 8 Apr. 1994, now abandoned, which is a Continuation-In-Part Application of U.S. patent application Ser. No. 08/053,060 filed on 26 Apr. 1993, now abandoned.

BACKGROUND OF THE INVENTION

The present invention relates generally to the field of snow-plows and specifically to snow plows that are designed to be mounted to vehicles like a car or truck.

Snow-plows that are mounted to a vehicle, e.g. a snow-plow mounted to a pick up or sport utility truck, typically are designed so that much of the apparatus that is part of the snow-plow system is mounted directly and permanently to the vehicle. The equipment that remains upon the vehicle before the plow is mounted or after the plow has been removed forms a metal frame work on the front of the vehicle that increases the front end weight of the vehicle, affects the life of suspension components of the vehicle and affects the ride and steering characteristics of the vehicle.

The present invention is designed so that there is only a small mounting subframe located beneath the front bumper of the vehicle which is attached to the vehicle frame. All other components of the snow-plow system are mounted to this mounting subframe so that they can be easily and quickly removed from the vehicle. Consequently there is no substantial amount of mounting equipment covering the front end of the vehicle and little added weight permanently attached to the vehicle.

Also, the quick connecting/disconnecting structure of the present invention makes it very easy to attach or disengage the snow-plow system from the vehicle. This saves the operator of the vehicle both time and effort when installing and removing the snow-plow system.

Also, the present invention addresses the problem of light weight snow-plow moldboards. Typically snow-plow moldboards mounted to smaller vehicles (e.g. pick-up trucks) are of such a light weight that they do not effectively plow or cut through all types of snow. Hard, drifted, or icy snow such as that found in the Western United States is not easily plowed by a light plow moldboard, e.g., a plow moldboard weighing 250 pounds or less. The present invention includes a reactive controlled pressure system that places a controlled predetermined pressure upon the moldboard of the plow system so that a portion of the weight of the vehicle to which the plow system is attached is actually transferred to the bottom edge of the plow moldboard and the plow moldboard acts as a moldboard weighing 2 to 3 times its actual weight. This snow-plow system is thereby able to easily plow through snow that a light weight snow-plow normally could not plow through.

Further the invention provides the flexibility of having, in effect, both a light weight plow (which is advantageous for certain conditions such as plowing light snow on a gravel driveway) and a heavy weight plow (which is advantageous for plowing drifted and hard packed snow and for scraping hard surfaces). This flexibility is obtained by having a reactive controlled pressure system which can be activated and deactivated by means of a simple electric control switch. The controlled pressure mechanism maintains a pressure within a certain predetermined low pressure and high pressure limit with a predetermined nominal pressure within these limits.

Further, the present invention addresses the problem of lights mounted to vehicles for plowing. Typically an additional set of headlights and parking lights are mounted to the front end of a vehicle for plowing. This is because the regular headlights and parking lights of the vehicle are usually hidden behind the plow moldboard and thus are obstructed by the plow moldboard especially in the raised position. As such, the lights are rendered ineffective. Consequently it is has been the case that an additional set of lights are mounted either upon the hood or up on the front grill of the vehicle so that they project over the front edge of the plow moldboard. The problem with this procedure is that these lights and their housings in and of themselves create obstructions in the driver's field of vision due to the fact that they are mounted on the vehicle. The device of the present invention moves these lights off of the vehicle and positions them so that they shine over the top edge of the moldboard while presenting a minimal obstruction to the field of vision of the driver or operator of the vehicle. The additional lights are removed when the snow-plow is removed (as the additional lights are not needed) so that they do not present any obstruction to vision or add any weight to the vehicle.

The inventor does not know of any prior art that either teaches or discloses the unique features of the present invention.

SUMMARY OF THE INVENTION

The present invention is a snow-plow system having four major features: a lighting system, a quick and easy connect/disconnect system, a reactive controlled pressure mechanism for applying a controlled pressure to the bottom edge of the moldboard of the plow, and a simple electric control to activate or de-activate the reactive controlled pressure mechanism.

Accordingly, the present invention may be summarized as a snow-plow system that is mounted to a vehicle having a mounting means by an easy connect and disconnect system; the snow-plow system connecting to the mounting means by use of three mounting pins which hold the snow-plow system in place on the mounting means and thereby rigidly connect the system to the vehicle. A telescoping light bar or lighting system is also rigidly mounted to the mounting means so that once the position of the lighting system is determined the relative position of the lighting system with respect to the vehicle does not change.

Finally, the present invention also includes a reactive controlled pressure mechanism that consists of a hydraulic control unit that is operated by an electric control unit mounted in the vehicle. This controlled pressure mechanism can be activated and de-activated by an electric switch to provide the snow plowing action desirable for varied plowing conditions.

On larger municipal trucks, the hydraulic control unit of the reactive controlled pressure mechanism may be operated by the power take off (PTO) commonly found on larger trucks. The PTO, which is controlled mechanically from within the cab of the municipal truck, operates the hydraulic pump that supplies non-compressible fluid to the hydraulic cylinder of the reactive controlled pressure mechanism at a predetermined pressure.

There are three cylinders within the system. Two of the cylinders pivot the plow moldboard either left to right or right to left. This is standard on most snow-plows. Between the two cylinders and extending from the bottom of an A-frame is the reactive controlled pressure cylinder. The reactive controlled pressure cylinder is pivotally mounted to the bottom of the A-frame and mechanically connected to the moldboard of the plow.

The system with respect to the reactive constant pressure cylinder works as follows: Power is supplied to the system from the vehicle's electrical system. The operator of the vehicle turns on the system by activating a switch on the electrical control unit located within the vehicle cab. This activates a pressure switch on the hydraulic control unit that pressurizes the hydraulic cylinder to a predetermined pressure. The pressure causes the hydraulic cylinder to react against the frame of the vehicle and push against the moldboard so that the bottom edge of the moldboard that is in contact with the road surface has an optimal amount of pressure transferred to it. A transference of vehicle weight to the bottom edge of the moldboard of the plow is also achieved.

The hydraulic control unit functions by monitoring the pressure within the hydraulic cylinder so that should the pressure drop below a predetermined lower level, for example if the cylinder were to extend out as when the level of the road surface were to drop, a pressure switch would sense this drop and then supply more hydraulic fluid from the hydraulic fluid reservoir to re-pressurize the cylinder to its nominal predetermined pressure level. Conversely, if the plow moldboard bottom edge engages a surface that tends to raise the plow moldboard, this will result in increasing the pressure within the cylinder. Once that pressure meets or exceeds a predetermined high pressure level, a relief valve connected to the hydraulic fluid reservoir will open and hydraulic fluid from the cylinder will drain back into the reservoir until the pressure within the cylinder reaches the nominal pressure level. In this manner the system reacts to road conditions and snow conditions so that the controlled pressure is substantially constantly maintained.

DETAILED DESCRIPTION

Figure 1:
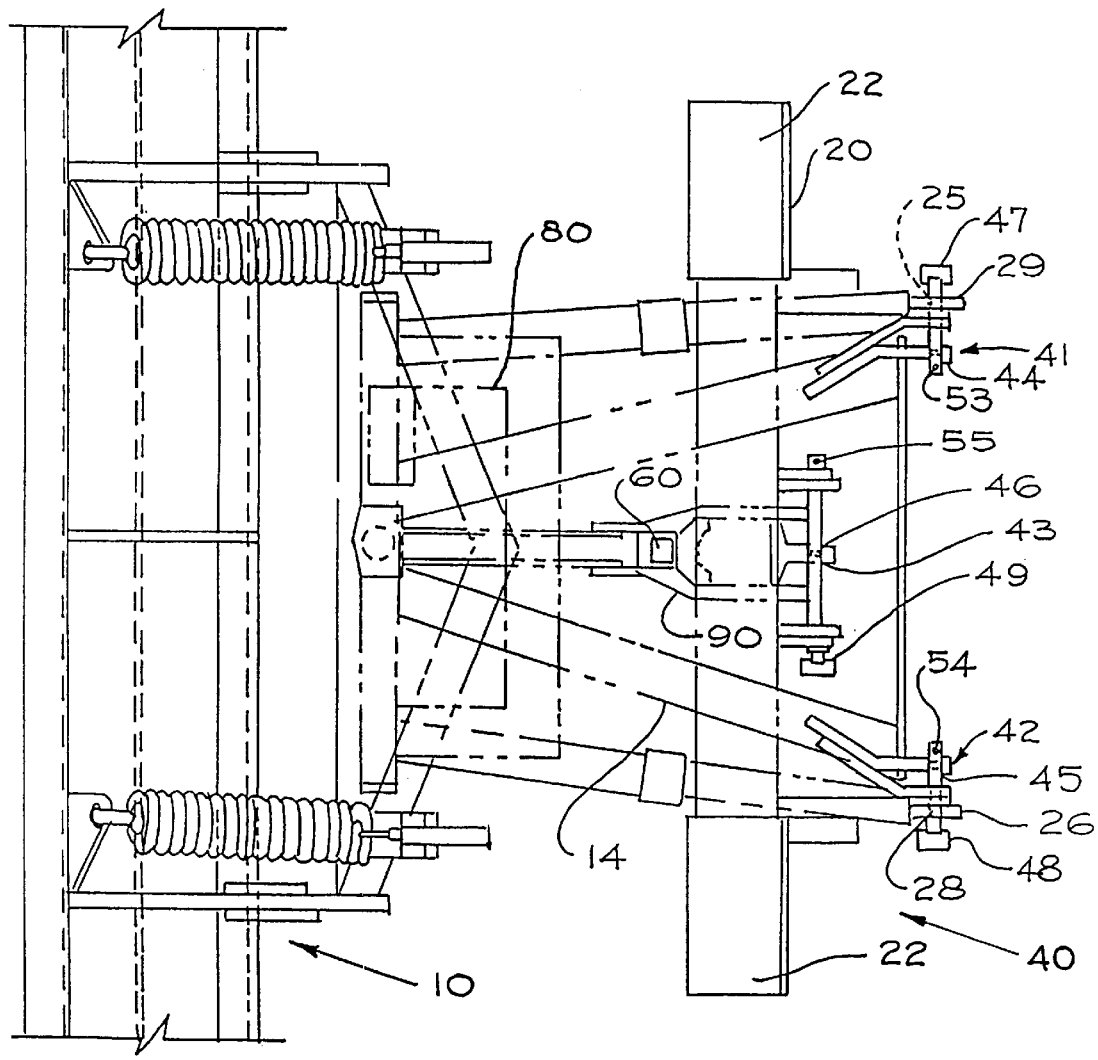
FIG. 1 is a top plan view of the snow-plow system.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention is a snow-plow system 10 for mounting to a vehicle 11. The main features of the snow-plow system 10 are a lighting system 20, a mounting system 40, a reactive controlled pressure system 60, and an electronic control for engaging and disengaging the controlled pressure system 70. The snow-plow system 10 further includes a moldboard 100 and an A-frame 14 for supporting and connecting the components of the snow-plow system 10.

Figure 2:
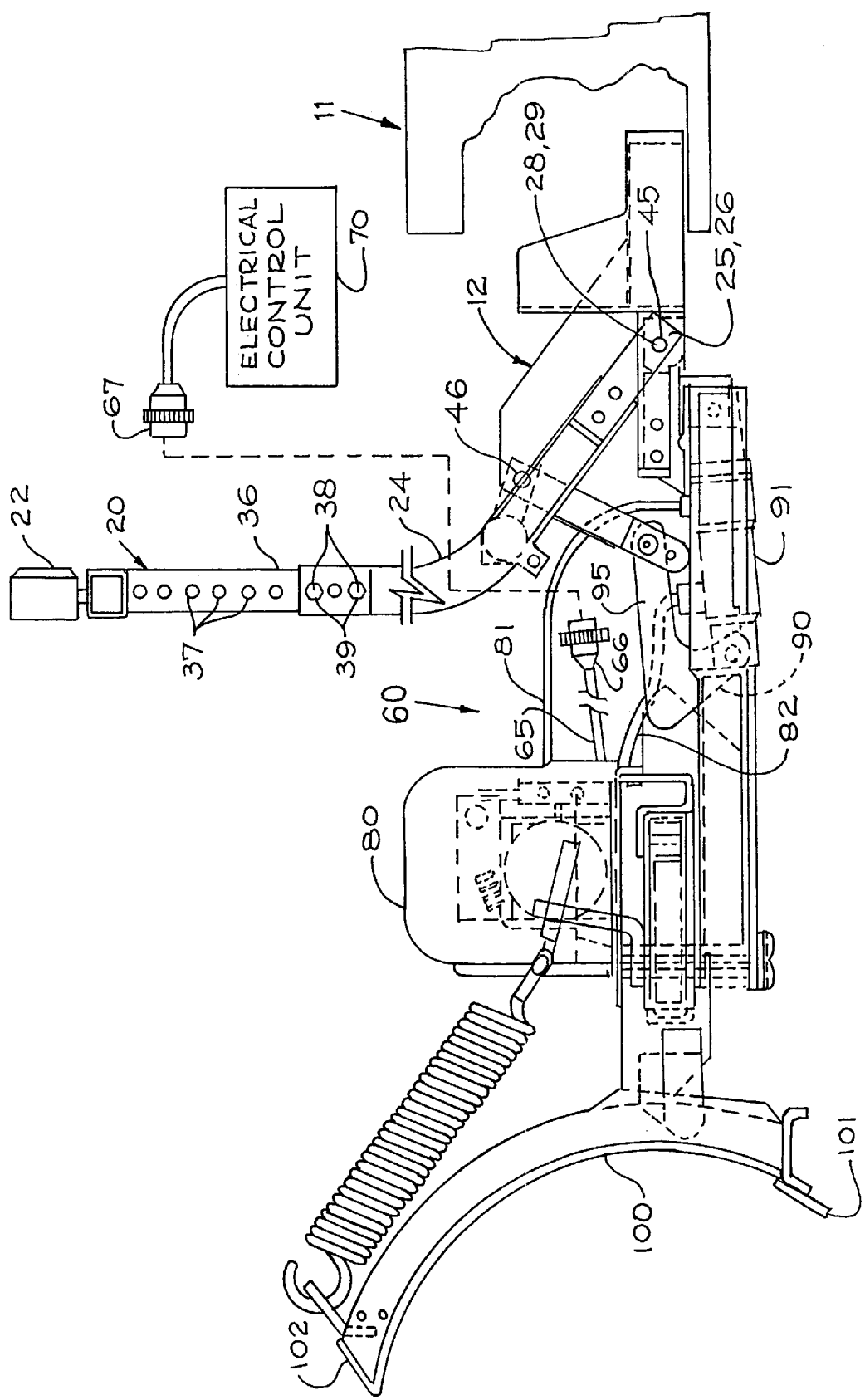
FIG. 2 is a side plan view of the snow-plow system.
Figure 3:
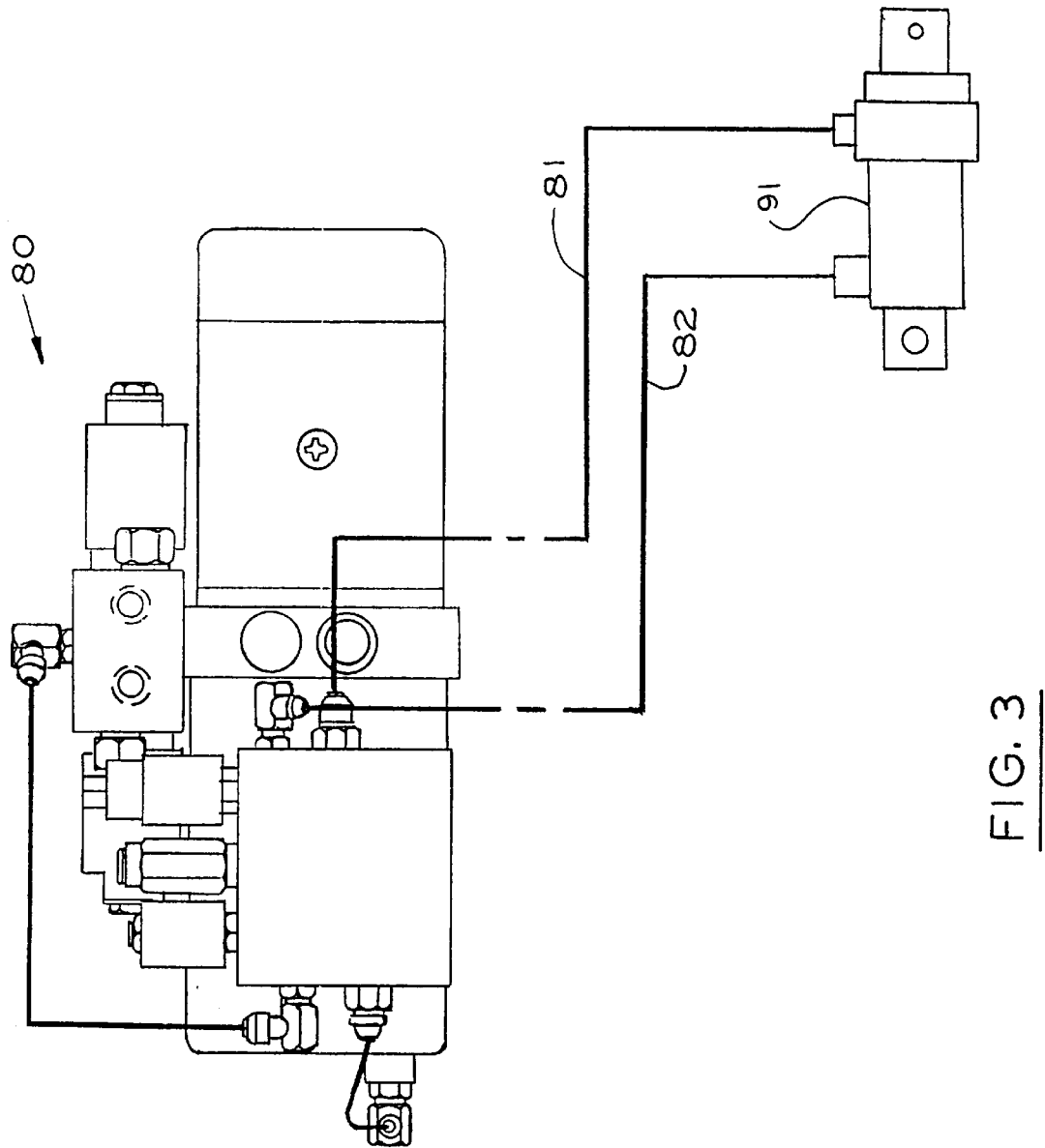
FIG. 3 is a schematic view showing the valve block and the main hydraulic or reactive constant pressure cylinder.
Figure 11:
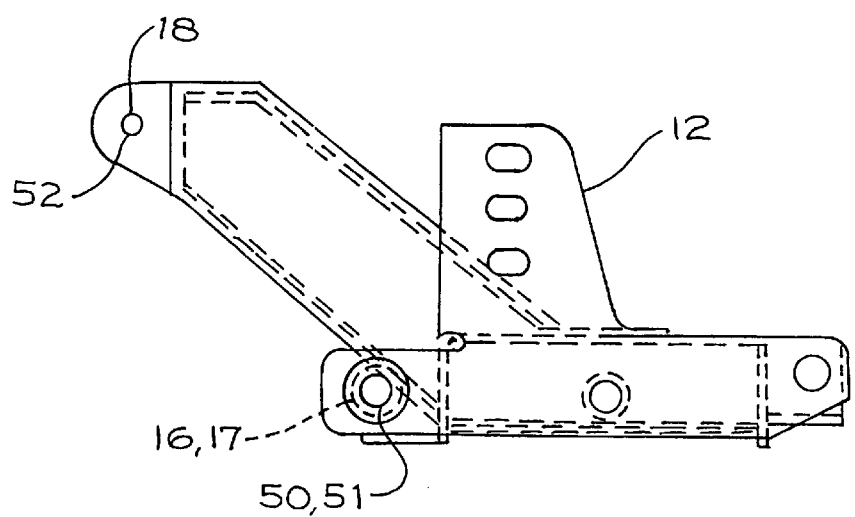
FIG. 11 is side plan view of the vehicle subframe.
Figure 5:
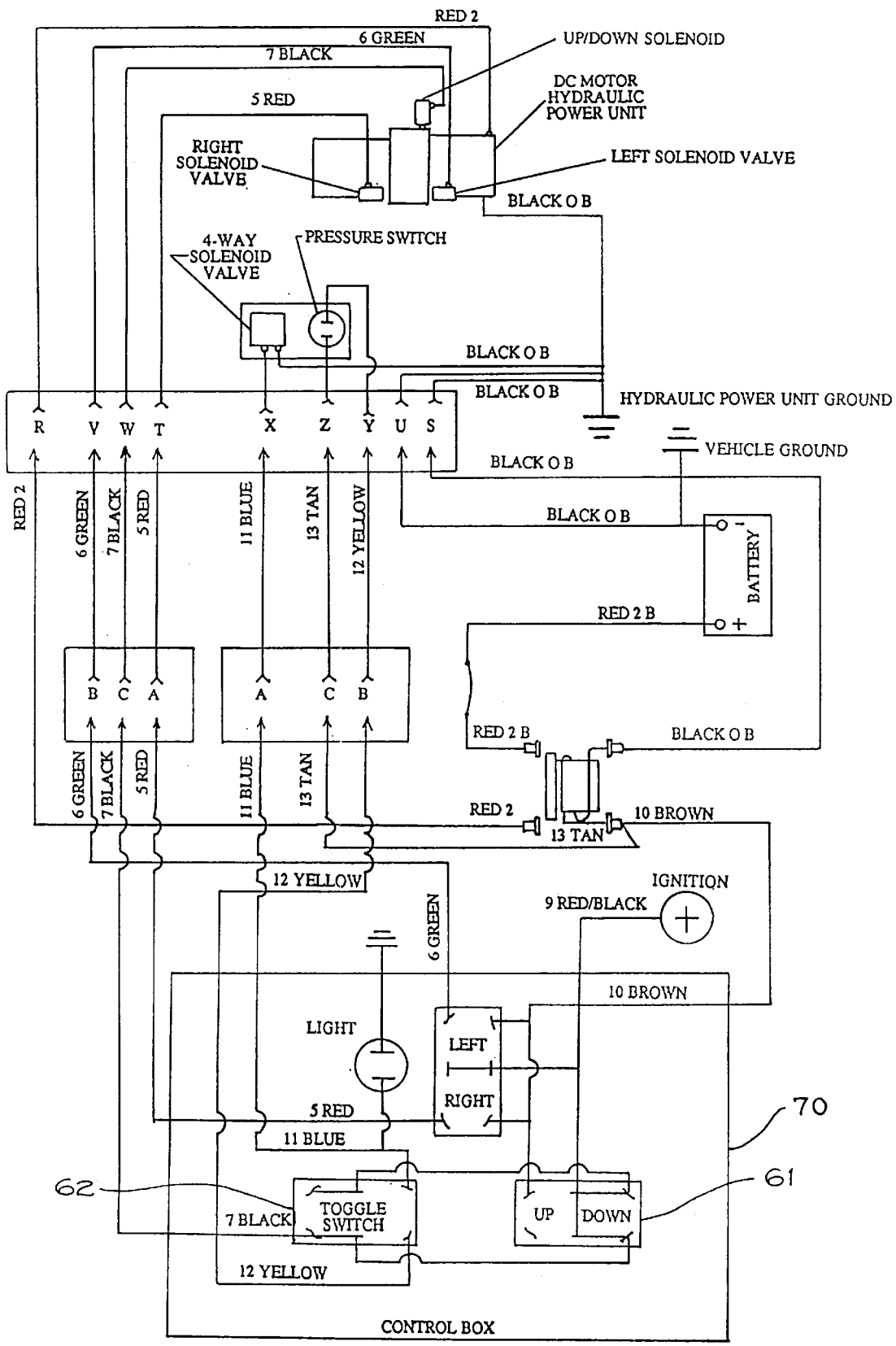
FIG. 5 is a schematic view of the electrical control circuit showing the circuit engaged in the blade down and float configuration.

The snow-plow system 10 is connected to the frame of the vehicle 11 with mounting system 40. Referring to FIGS. 2 and 11 the snow-plow system 10 may be seen to be connected to the vehicle 11 by a mounting subframe 12 that is fixedly connected to the frame of the vehicle 11.

The mounting system 40 is integral to the A-frame 14 as shown in FIG. 1. The subframe 12 has mounting points 16–18 having openings 50–52 as shown in FIG. 11. The mounting system 40 has three mounting points 41–43, having openings 44–46, and three mounting pins 47–49. Mounting points 16–18 of the subframe 12 correspond to mounting points 41–43 of the mounting system 40 so that openings 50–52 align respectively with openings 44–46. Pins 47–49 pass through the aligned openings 50–52 and 44–46. Locking pins 53–55 are respectively used to hold the pins 41–43 in place in the openings 50–52 and 44–46 during operation of the vehicle 11. In this manner the snow-plow system 10 of the present invention is quickly and easily mounted to the vehicle 11 so that there is a rigid and fixed connection between the vehicle 11 and the snow-plow system 10 through the mounting subframe 12 which is attached to the frame of the vehicle 11.

Figure 4:
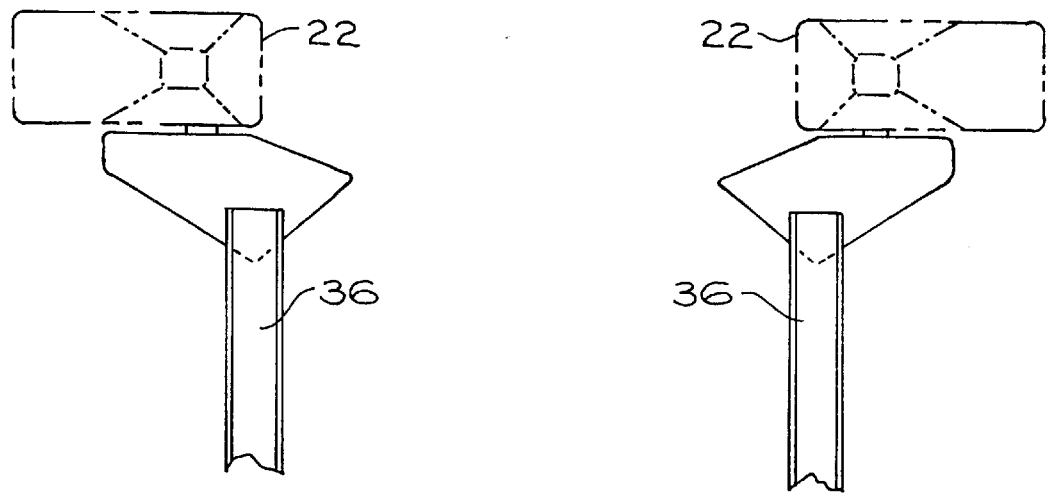
FIG. 4 is a rear plan view of the lighting system.

Referring now to FIGS. 1, 2, and 4 the lighting system 20 may be seen to comprise a set of high intensity light road lights 22 mounted to a support frame 24. Any type of lights 22 providing sufficient illumination could be used. The lights 22 are powered from the vehicle 11 in a known manner. The support frame 24 has two mounting points 25–26 having openings 28–29. As specifically shown in FIGS. 1 and 2 the mounting points 25–26 line up with the mounting points 41 and 42 of the mounting system 40. Accordingly, the support frame 24 is fixedly and rigidly mounted to the subframe 12 by the same mounting system 40 as is the rest of the snow-plow system 10 by the pins 47 and 48 of the mounting system 40. In this manner the lighting system 20 is rigidly and fixedly mounted to the vehicle 11 with the lights 22 positioned to shine over the top edge 102 of the moldboard 100 and at the same time being set off from the body of the vehicle 11 to minimize any obstructions to the vehicle operator's field of vision.

Further, referring specifically to FIG. 2, the support frame 24 may be seen to include two posts 36 that are telescopically adjustable to move the lights 22 vertically up or down with respect to the plow system 10. A plurality of openings 37 extend up and down the sides of the posts 36. Once the proper height for the lights 22 has been determined the openings 37 in the telescoping posts 36 are aligned with openings 39 in support frame 24 and bolts 38 are passed through the openings 37 and 39. Each bolt 38 is secured by using a nut. This holds the lights 22 in the vertical position desired. Accordingly, the lighting system 20 of the present invention may be easily adjusted to the needs of the individual vehicle operator and in order to obtain maximum illumination of the area in front of the vehicle regardless of the snow-plow's position.

Referring to FIGS. 1–3 and 5–10 the reactive controlled pressure system 60 may be seen to comprise an electrical control unit 70, a hydraulic control unit 80, and a hydraulic cylinder linkage 90. As can be seen in FIG. 2, hydraulic cylinder linkage 90 includes a bell crank 95 to aid in the effective transference of weight or force from the mass of the vehicle 11 to the bottom edge 101 of the moldboard 100. While a bell crank 95 is the means of mechanical linkage disclosed, it is not the only possible means for accomplishing the same function.

The electrical control unit 70 is shown schematically in FIGS. 5–7B. The electrical control unit 70 operates off the battery power of the vehicle 11 and is energized when the vehicle ignition key is turned to the accessory setting or when the engine of the vehicle 11 is running. The electrical control wiring harness 65 includes a plug 66 and a receptacle 67 that can be separated when the snow-plowing system 10 is removed from vehicle 11. As shown in FIGS. 5–7B, the electrical control unit 70 has two switches 61 and 62 that control the hydraulic lift and reactive pressure control unit 80.

The hydraulic control unit 80 is connected to the reactive controlled pressure mechanism or hydraulic cylinder 91 by hoses 81 and 82. The hydraulic control unit 80 supplies non-compressible fluid, hydraulic oil, to the cylinder 91. Hydraulic cylinder linkage 90, a bell crank, is connected to hydraulic cylinder 91.

Figure 7A:
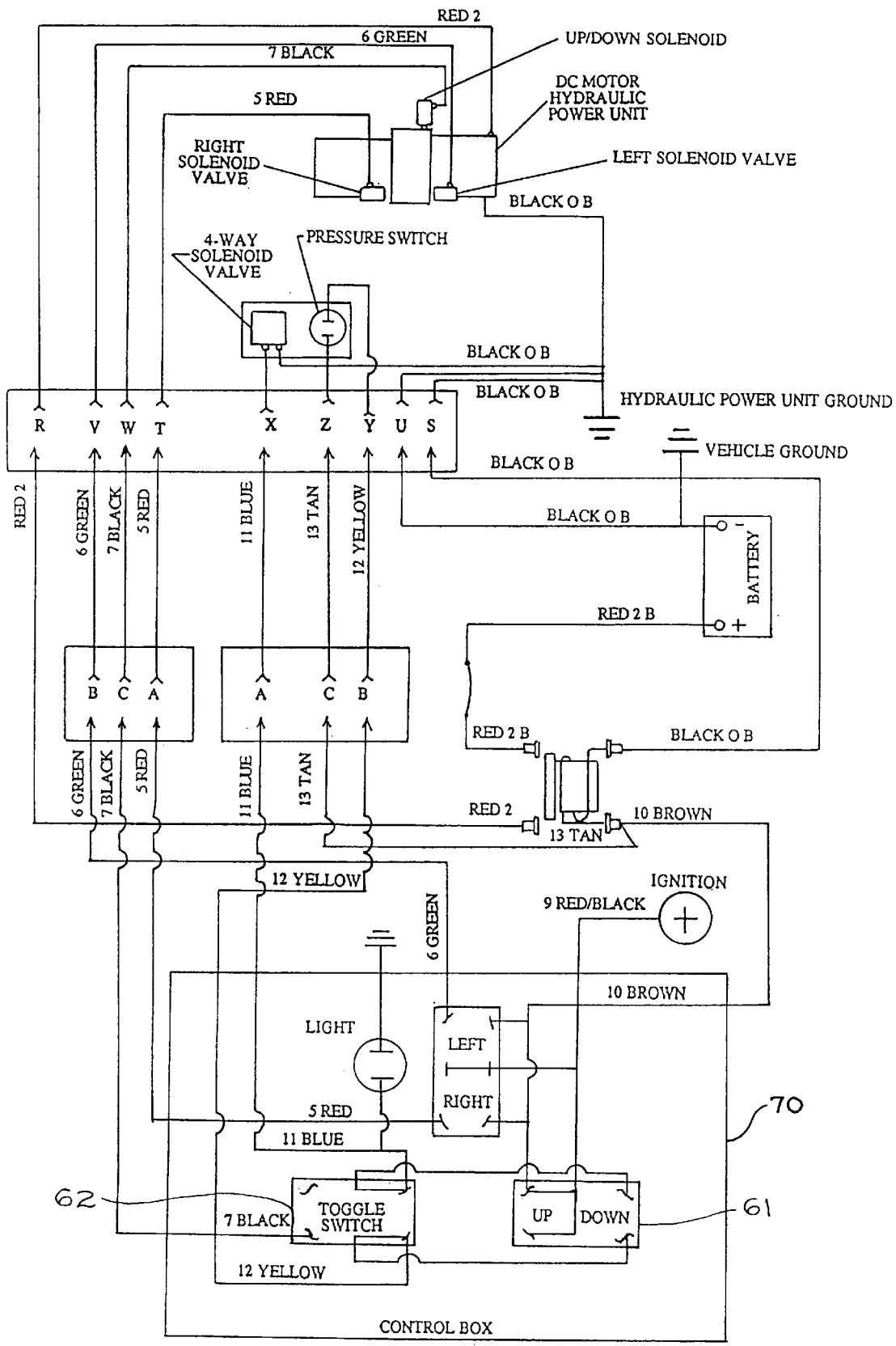
FIG. 7A is a schematic view of the electrical control circuit showing the circuit engaged in the raise configuration.

The reactive constant pressure system works as follows: To raise the plow moldboard 100 the operator actuates switch 61 as shown in FIG. 7A to the up position. Now referring to FIG. 10, the four way valve 110 and the two way valve 111 are de-energized. When the switch 61 energizes the pump 112, valve 111 blocks the flow to the reservoir 120. This causes the oil to flow into valve 110 from port 3 and out of valve 110 through port 2 into the rod end 92 of the cylinder 91. This lifts the plow moldboard 100. The opposite end of the cylinder 91 is open to the reservoir 120 through ports 4 to 1. When the cylinder 91 is completely extended the pump 112 is turned off by releasing the control switch 61.

Figure 7B:
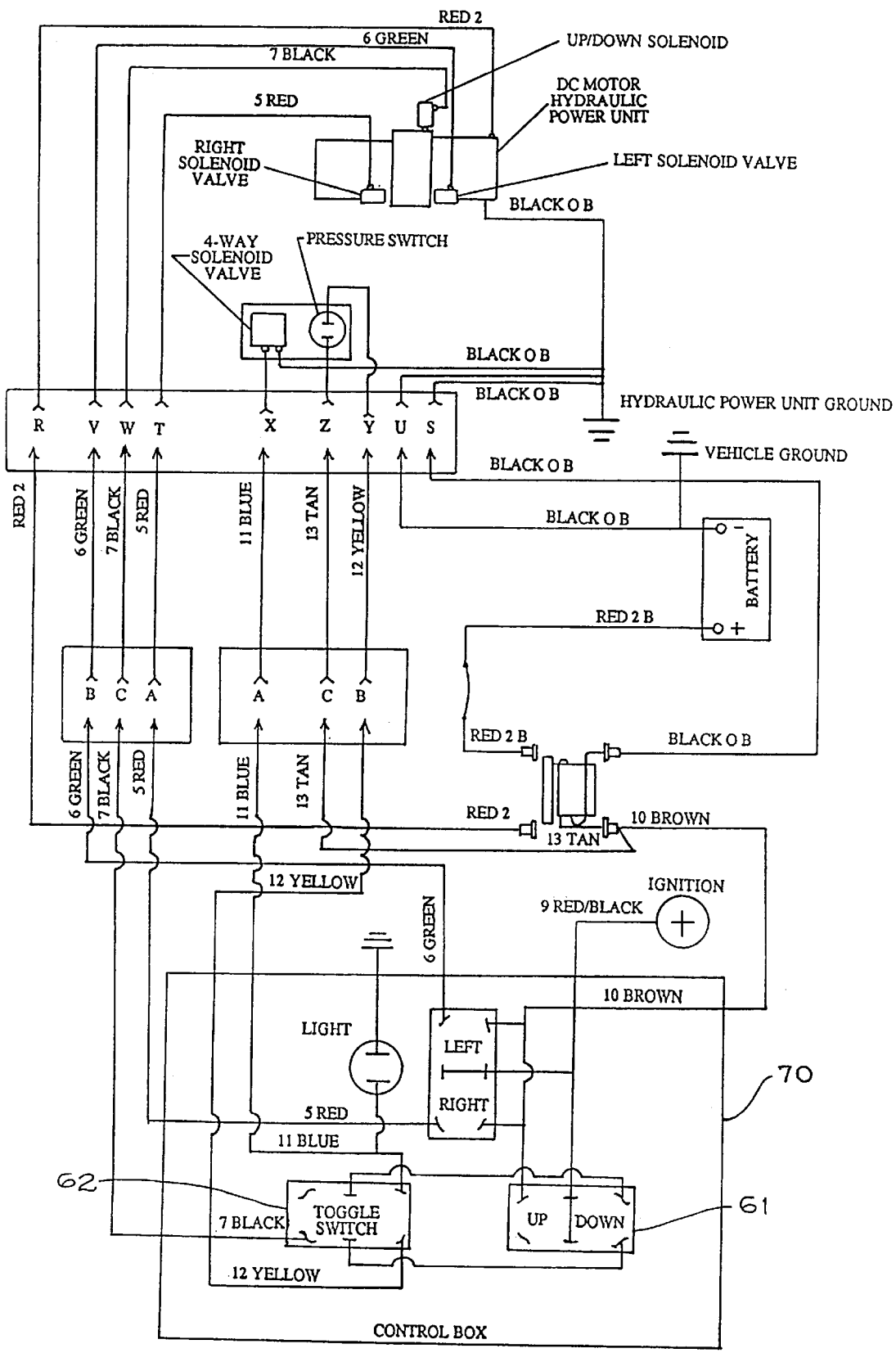
FIG. 7B is a schematic view of the electrical control circuit showing the circuit engaged in the hold configuration.

To hold the plow moldboard 100 in a raised position for transport, the switch 61 is held in a neutral position and the switch 62 can be in either position as shown in FIG. 7B. This position de-energizes the pump 112 and the valves 110 and 111. Valve 111 blocks oil flow to the reservoir so that the raised position of the plow is maintained. See FIG. 10.

Figure 8:
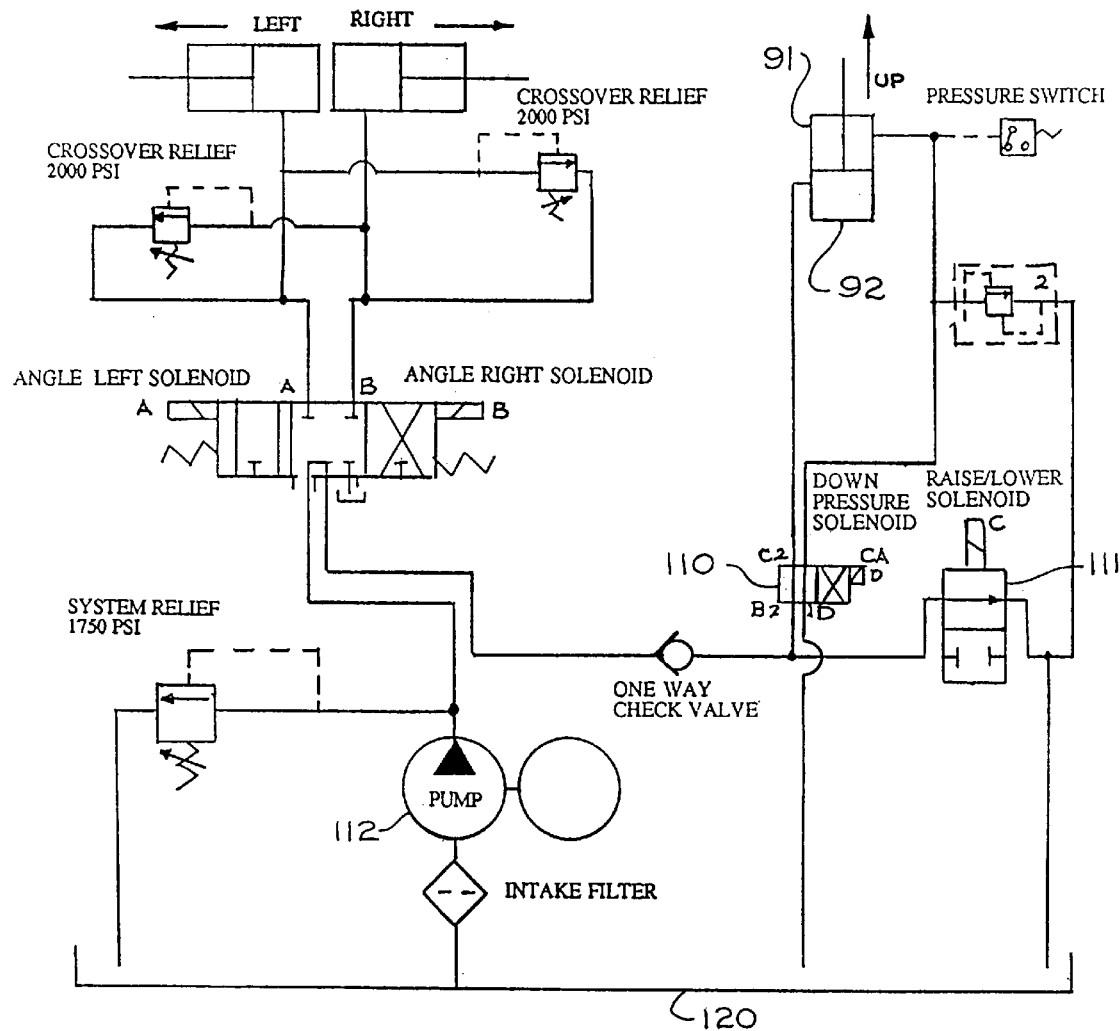
FIG. 8 is a schematic view showing the hydraulic control system in the blade float configuration.

To float the plow moldboard 100 so that it is in the down position but has no down pressure on it, the control switch 61 is depressed to the down position and control switch 62 is depressed to the float position. See FIG. 5. Referring to FIG. 8, this energizes valve 111 and deenergizes valve 110. Energizing valve 111 opens the rod end 92 of the cylinder 91 to the reservoir 120. Thus both ends of the cylinder 91 are connected to the reservoir 120 and the moldboard 100 will float.

Figure 6:
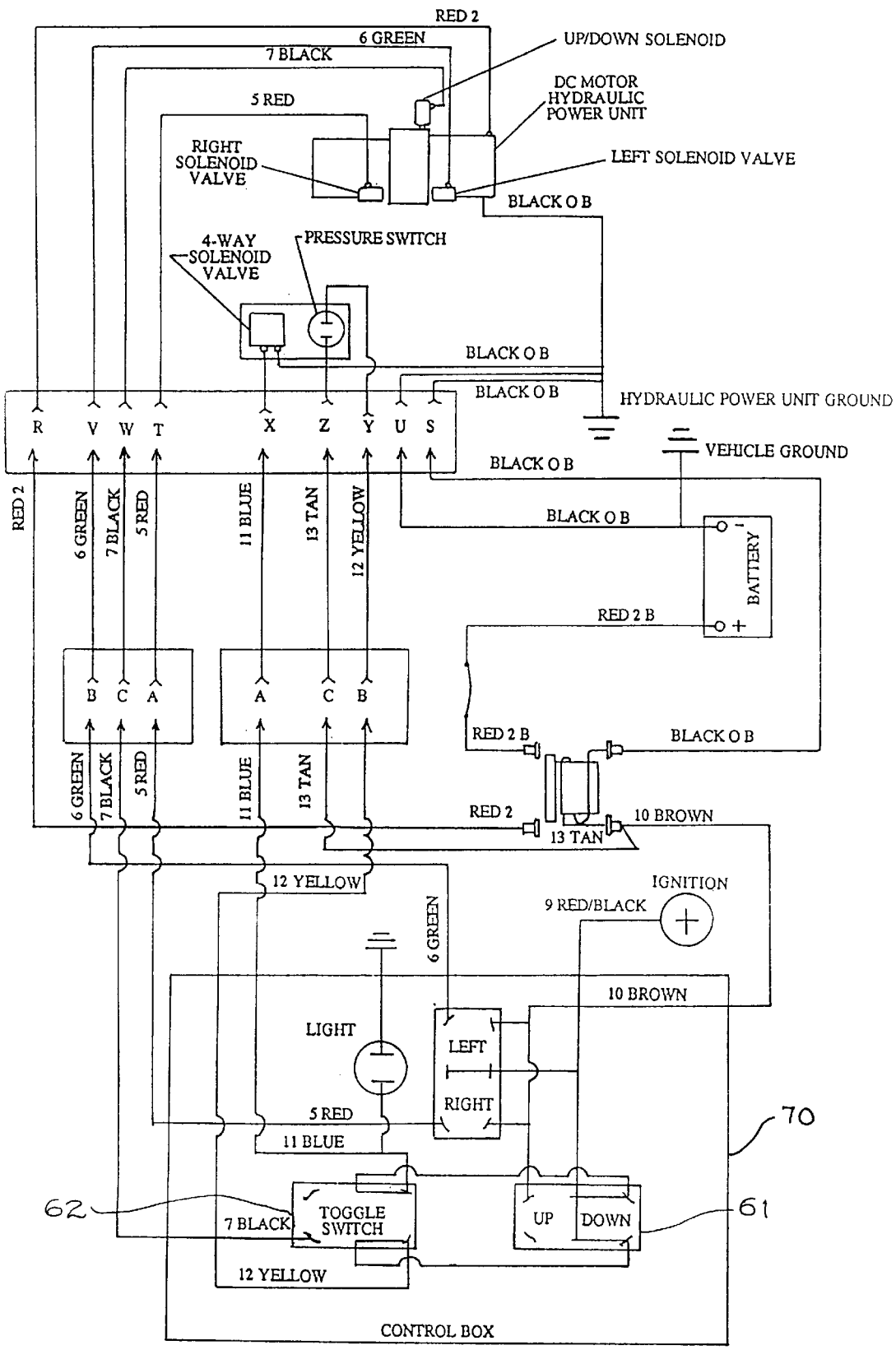
FIG. 6 is a schematic view of the electrical control circuit showing the circuit engaged in the pressure down configuration.
Figure 9:
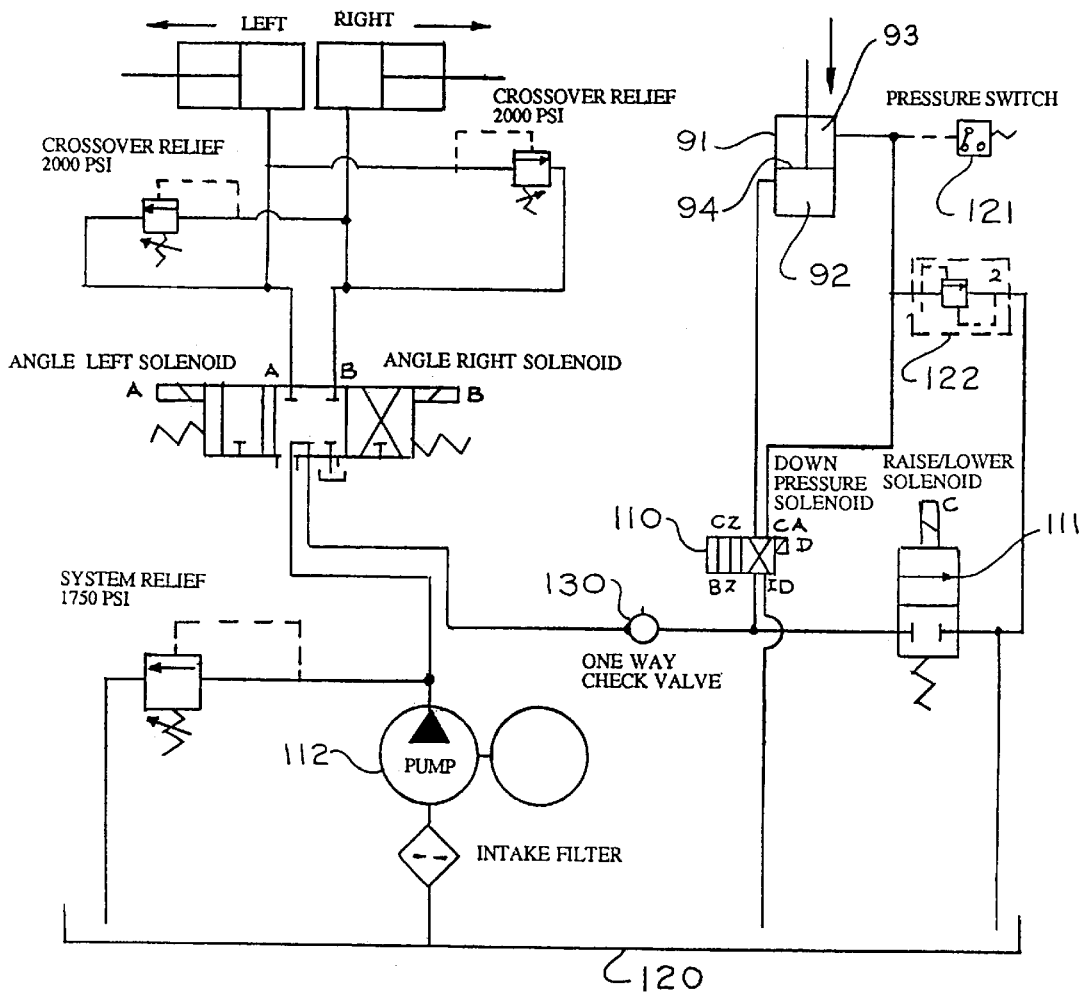
FIG. 9 is a schematic view showing the hydraulic control system in the pressure down configuration.
Figure 10:
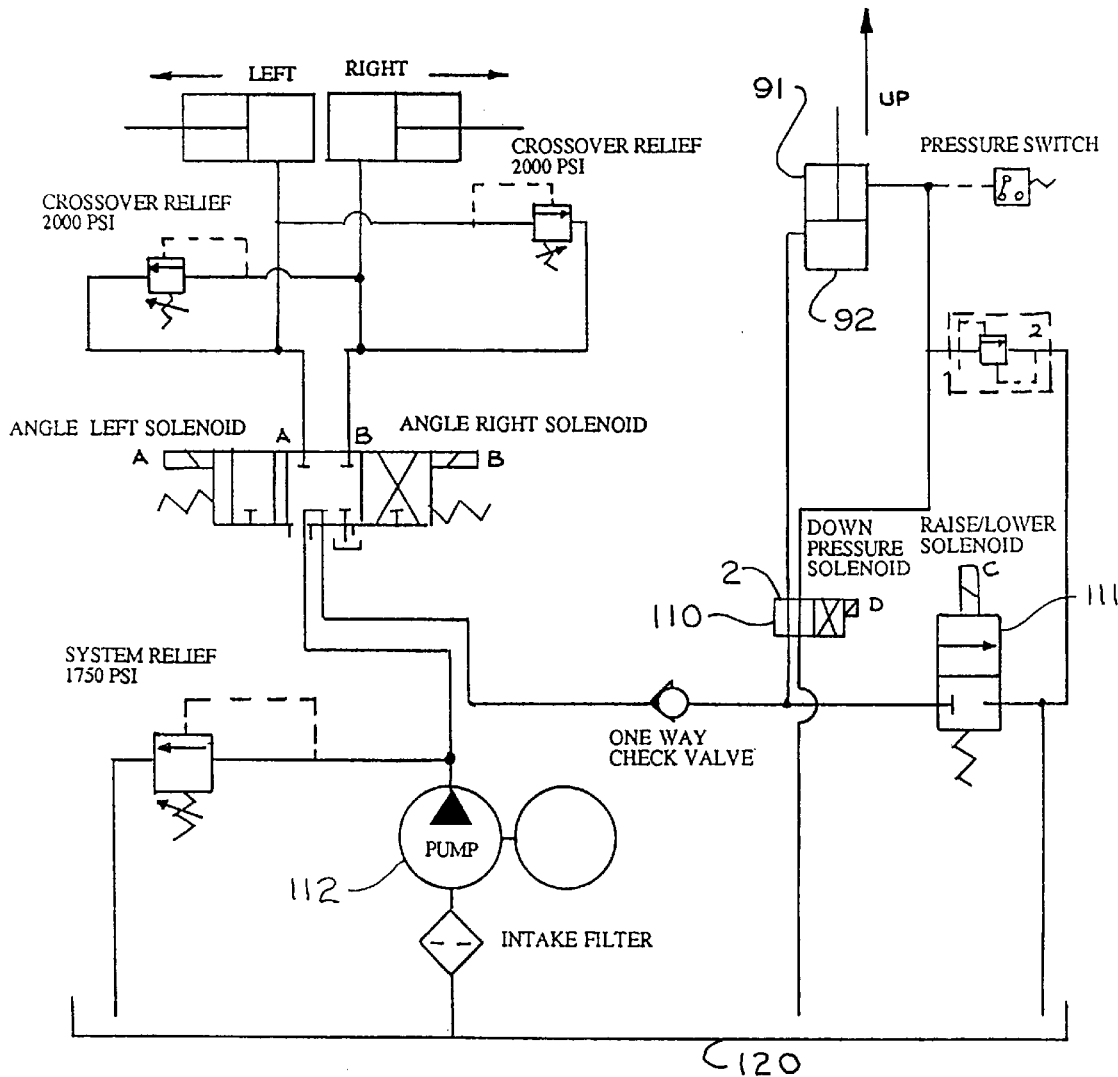
FIG. 10 is a schematic view showing the hydraulic control system in the raise and hold position.

To apply a predetermined down pressure to the plow moldboard 100, the control switch 61 is depressed to the down position and control switch 62 is depressed to the pressure position as shown in FIG. 6. This energizes the four way valve 110 and connects a pressure switch 121 to the pump activating circuit as shown in FIG. 9. Energizing valve 110 reverses the flow of oil from the pump 112 to the opposite end 93 of the cylinder 91 putting a predetermined amount of pressure upon the bottom edge 101 of the plow moldboard 100.

When the pressure on the piston 94 of the hydraulic cylinder 91 reaches the predetermined pressure that has been set, the pressure switch 121 activates and opens the circuit stopping the pump 112. The check valve 130 in the line prior to valve 110 retains the oil in the piston 94 so that the there is a controlled predetermined pressure maintained on the bottom edge 101 of the moldboard 100.

If the bottom edge 101 of the moldboard 100 rises, e.g. due to a change in road surface, sufficient to increase the pressure within the cylinder 91 beyond a predetermined high pressure setting, then the relief valve 122 opens and oil is allowed to flow back into the reservoir 120 until the pressure in the cylinder 91 drops down to below the predetermined high pressure setting.

Once the situation causing the high pressure abates, the pressure can drop down to a predetermined low pressure setting when the bottom edge 101 of the moldboard returns to a normal plowing position. At this predetermined low pressure the pressure switch 121 again activates the pump 112 and oil is pumped from the reservoir 120 into the cylinder 91 until the predetermined nominal pressure is again reached.

It should be noted that it is not necessary for there to be a pressure increase before there is a pressure drop. If the plow moldboard 100 drops into a depression on the surface being plowed, the oil pressure in the cylinder 91 could drop below the predetermined minimum setting. This drop would also be sensed by the pressure switch 121 and cause activation of the pump 112 to increase the pressure in the cylinder 91 back up the predetermined nominal pressure setting.

Furthermore, it should be noted that the plow moldboard 100 can be raised without releasing control switch 62 from the pressure position. By merely depressing control switch 61 to the up position, the plow moldboard 100 is lifted without disengaging the down pressure system. When the moldboard 100 is subsequently lowered, the predetermined downward pressure is again applied to the bottom edge 101 of the plow moldboard 100.

In its specific embodiment the pressure differential is set so that the difference between the highest internal pressure in the cylinder 91 and the lowest internal pressure will allow the plow moldboard 100 to follow the surface contour of the road over small variations without activating the pump 112 or relief valve 122 and yet react to maintain a nearly constantly controlled pressure upon the bottom edge 101 of the plow moldboard 100.

In the preferred embodiment, the nominal pressure setting is 500 psi, the low pressure setting is 450 psi, and the high pressure setting is 600 psi. It is to be understood, however, that different pressure settings can be used to obtain the optimum weight transfer if this system is used with heavier or lighter weight snow-plows or if the geometry of the lift mechanism is changed. The above described embodiments of this invention are merely descriptive of its principles and are not to be limited. The scope of this invention instead shall be determined from the scope of the following claims, including their equivalents.

What is claimed is:

1. A method of operating a snowplow, comprising the steps of:

adjustably mounting a snowplow blade having a moldboard on a vehicle;

applying substantially downward force to the moldboard;

using a pressure sensing device to monitor a pressure indicative of the substantially downward force applied to the moldboard as the snowplow blade moves over terrain; and adjusting the substantially downward force applied to the moldboard in correspondence with the pressure monitored by the pressure sensing device as the snowplow blade moves over terrain.

2. The method as defined in claim 1, wherein the substantially downward force is adjusted automatically.

3. The method as defined in claim 1, wherein the substantially downward force is automatically maintained within a preestablished range as the moldboard moves over uneven terrain.

4. The method as defined in claim 3, wherein the preestablished range has a low pressure setting of 450 psi and a high pressure setting of 600 psi and a nominal pressure setting of 500 psi.

5. The method as defined in claim 3, wherein the preestablished range is varied as the weight of the snowplow varies.

6. The method as defined in claim 1, wherein the substantially downward force monitoring and adjusting is enabled and disabled using at least one electric control circuit.

7. The method as defined in claim 6, wherein the snowplow blade can be raised without disabling the substantially downward force monitoring.

8. A method of operating a snowplow, comprising the steps of:

mounting a snowplow blade having a moldboard on a vehicle;

operating a fluid pressure device to apply a substantially downward force to the moldboard;

monitoring pressurized fluid supplied to the fluid pressure device to provide an output indicative of the substantially downward force applied to the moldboard as the snowplow blade moves over terrain; and using the output to automatically adjust the substantially downward force applied to the moldboard as the snowplow blade moves over terrain.

9. The method as defined in claim 8, wherein the substantially downward force is automatically maintained within a preestablished range as the moldboard moves over uneven terrain.

10. The method as defined in claim 9, wherein the preestablished range has a low pressure setting of 450 psi and a high pressure setting of 600 psi and a nominal pressure setting of 500 psi.

11. The method as defined in claim 9, wherein the preestablished range is varied as the weight of the snowplow varies.

12. The method as defined in claim 8, wherein the substantially downward force monitoring and adjusting is enabled and disabled using at least one electric control circuit.

13. The method as defined in claim 8, wherein the snowplow blade can be raised without disabling the substantially downward force monitoring.

14. A method of operating a snowplow, comprising the steps of:

mounting a snowplow blade having a moldboard on a vehicle;

applying substantially downward force to the moldboard;

monitoring the substantially downward force applied to the moldboard as the snowplow blade moves over terrain;

automatically adjusting the substantially downward force applied to the moldboard as the snowplow blade moves over terrain; and maintaining the substantially downward force within a preestablished range, wherein the range has a low pressure setting, a high pressure setting and a nominal setting.

15. The method as defined in claim 14, wherein the low pressure setting is 450 psi, the high pressure setting is 600 psi and the nominal pressure setting is 500 psi.

16. The method as defined in claim 14, including selecting the preestablished range in accordance with the weight of the snowplow.

17. The method as defined in claim 14, wherein the substantially downward force monitoring and adjusting is enabled and disabled using at least one electric control circuit, the electric control circuit including at least one pressure sensitive switch that establishes one of the pressure settings.

18. The method as defined in claim 14, wherein the snowplow blade can be raised without disabling the substantially downward force monitoring.

19. A method of operating a snowplow, comprising the steps of:

mounting a snowplow blade having a moldboard on a vehicle;

applying substantially downward force to the moldboard; and maintaining the substantially downward force within a preestablished range, wherein the preestablished range has a low pressure setting, a high pressure setting and a nominal pressure setting;

wherein maintaining the substantially downward force within a preestablished range includes monitoring the substantially downward force applied to the moldboard using at least one of an electric control circuit and a hydraulic control circuit as the snowplow blade moves over terrain, the electric control circuit including at least one pressure sensitive switch which establishes a first one of the pressure settings, and the hydraulic control circuit including at least a first valve which establishes a second one of the pressure settings, and at least a second valve which establishes a third one of the pressure settings; and automatically adjusting the substantially downward force applied to the moldboard using at least one of the electric control circuit and the hydraulic control circuit as the snowplow blade moves over terrain, the difference between the high pressure setting and the low pressure setting allowing the moldboard to follow contours of the terrain over small variations without exceeding either one of the first pressure setting and the second pressure setting.

20. The method as defined in claim 19, wherein the preestablished range is varied as the weight of the snowplow varies.

* * * * *